Figure 1:
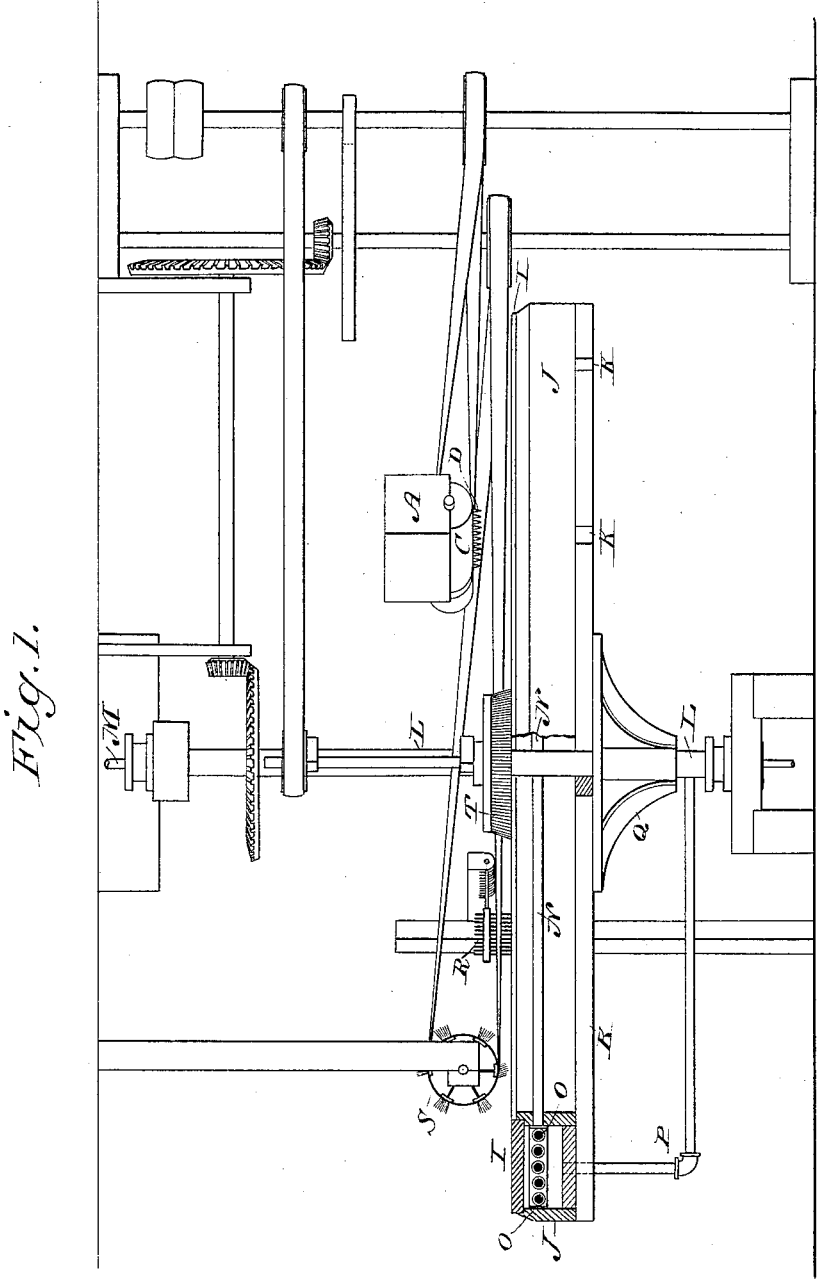

(No Model.) 3 Sheets—Sheet 1.
F. P. STIKER.
APPARATUS FOR THE MANUFACTURE OF STARCH.

No. 327,034. Patented Sept. 29, 1885.

WITNESSES
Ed. A. Newman.
Cal. C. Newman.

INVENTOR
Flavius P. Stiker
By his Attorneys
Baldwin, Hopkins, & Peyton.

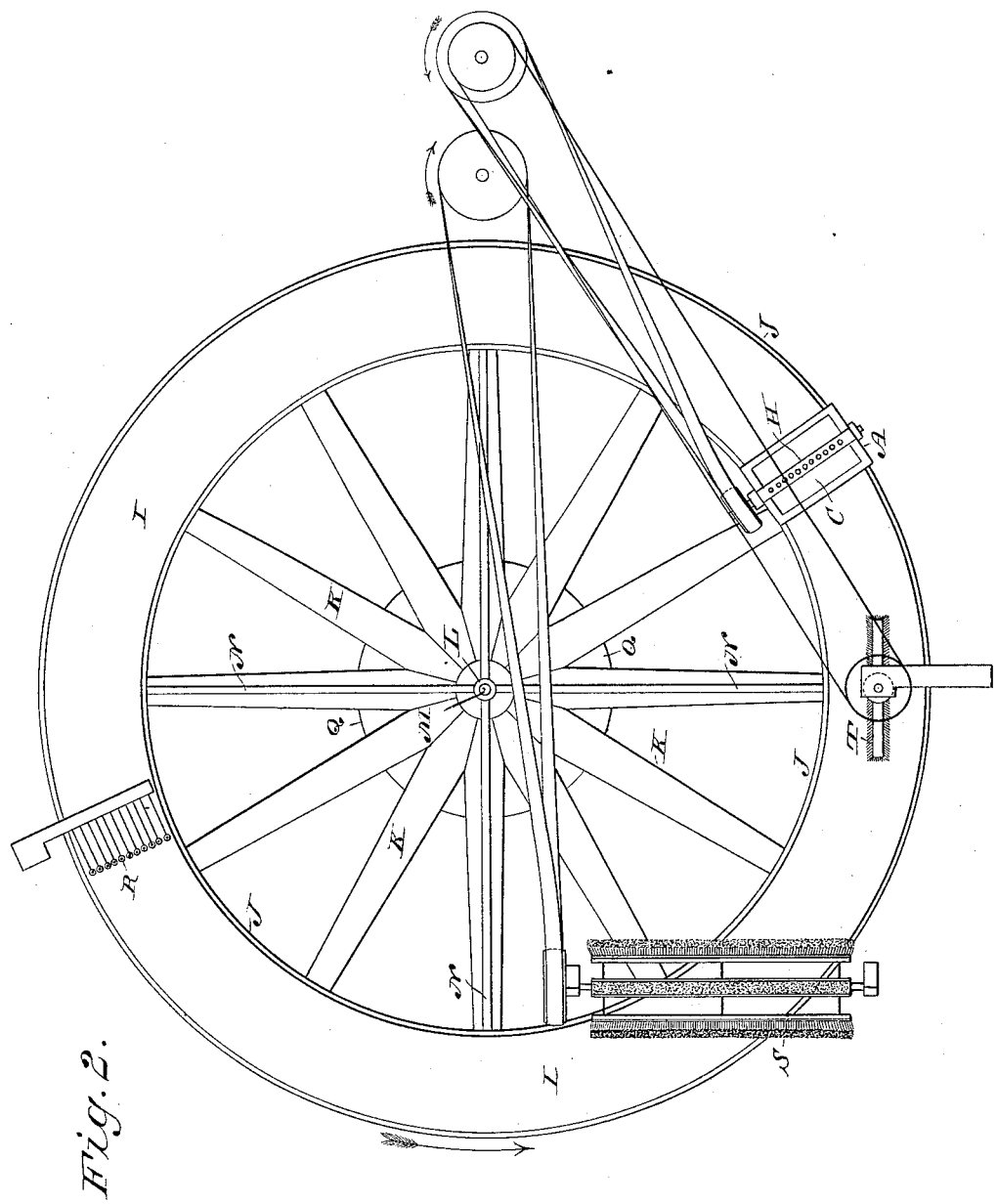

(No Model.) 3 Sheets—Sheet 3.
F. P. STIKER.
APPARATUS FOR THE MANUFACTURE OF STARCH.
No. 327,034. Patented Sept. 29, 1885.
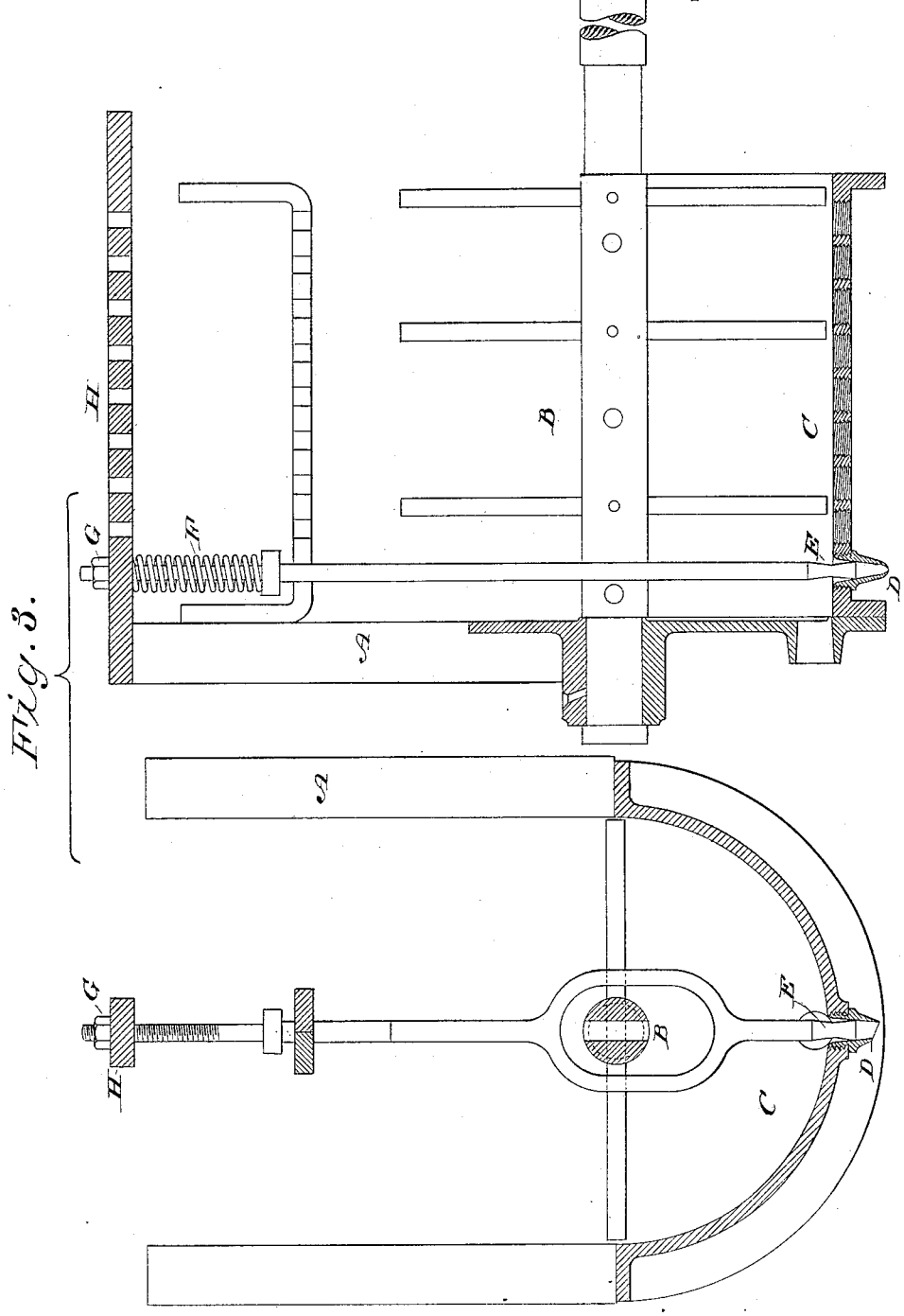
WITNESSES
Ed. A. Newman
Al. C. Newman
INVENTOR
Flavius P. Stiker,
By his Attorneys
Baldwin, Hopkins, & Peyton.

UNITED STATES PATENT OFFICE.

FLAVIUS P. STIKER, OF OSWEGO, NEW YORK, ASSIGNOR TO THOMSON KINGSFORD, OF SAME PLACE.

APPARATUS FOR THE MANUFACTURE OF STARCH.

SPECIFICATION forming part of Letters Patent No. 327,034, dated September 29, 1885.

Application filed April 24, 1885. (No model.)

*To all whom it may concern:*

Be it known that I, FLAVIUS P. STIKER, of Oswego, in the county of Oswego and State of New York, have invented certain new and useful Improvements in Apparatus for the Manufacture of Starch, of which the following is a specification, reference being had to the accompanying drawings.

This invention is an improvement upon that described in United States Patent granted to Thomson Kingsford April 23, 1878, No. 202,832, and operates upon the same general principle and according to the method claimed in that patent. In fact, it is an improved apparatus for practicing that method to better advantage.

By my invention I employ an annular rotating heated absorbent surface to receive the starch as it drops from a tank, instead of an endless belt, as described in the said patent.

In the accompanying drawings, illustrating my improved apparatus, Figure 1 is an elevation partly in section. Fig. 2 is a top plan view, and Fig. 3 is an enlarged view of an improved liquid-starch dripping-tank.

Referring to the letters upon the drawings, A indicates the dripping-tank, which may be rectangular or of any other form desired, in which is placed the liquid starch. This tank is provided with a suitable agitator, B, which is caused to revolve within it by any ordinary means—for instance, a belt or bevel-gears—to thoroughly stir and agitate the liquid starch. The tank is provided with a semicircular bottom, C, having a suitable number of dripping-tubes, D, each being screwed into an aperture in the semicircular bottom and being open at its lower end, so as to permit the dripping out of the liquid starch contained in the tank. In each dripping-tube is fitted a plug or valve, E, provided at its top with a coil-spring, F, which tends to keep it down tight in the dripping-tube, so as to close the latter. The spring-valves are provided with nuts G above where they pass through the plate or bar H, and by means of such nuts the valves can be raised more or less, as required, to permit the proper drip of liquid starch from the dripping-tubes. I do not, however, confine myself to this particular means of raising the valves from their seats and opening the dripping-tubes, as it would be easy to provide a bar which could be raised by means of screws or otherwise to elevate all of the valves at once and to the same extent. By raising the valves more or less of course the rapidity of dropping is regulated. The drops of starch falling from the dripping-tubes strike upon the heated absorbent annular revolving disk or surface I, the purpose of which is to rapidly effect the proper drying of the starch under normal atmospheric pressure and conditions. This absorbent surface is composed of plaster or other suitable porous material supported upon a suitable frame carried by the arms K, the arms, frame, and absorbent surface forming, substantially, a wheel, which revolves on the vertical axle L, (by means of a belt or otherwise,) supported in suitable bearings above and below, as illustrated.

In order to heat the annular absorbent surface I provide a pipe, M, leading from any steam-generator (not illustrated) into the hollow axle L, and passing downward to a little below the level of the absorbent surface, where it is led off by distributing-pipes N to the coils O, immediately underneath the absorbent surface. After being circulated through these coils it, with the water of condensation, passes down and out through pipe P to any suitable receptacle.

Q indicates bracing-supports around the axle L for the arms K.

R indicates suitable fingers, operating somewhat like stationary rake-teeth, bearing upon the rotating absorbent surface. These fingers should be the same in number and coincident in circular line with the discharge-openings in the dripping-tubes. These fingers may be supported in any suitable bar or frame, in which they may be adjustable, if desired, to compensate for wear.

S indicates a revolving brush supported in suitable bearings above the absorbent surface, and to which rotary motion is given by any suitable means. This brush bears upon the absorbent surface, and may also be supported in ordinary adjustable bearings, so that it may be adjusted to compensate for wear. Any ordinary means may be employed for vertically adjusting the supports of the fingers or the fingers themselves, and for vertically adjusting the bearings of the shafts of the brushes, as other like devices have heretofore been adjusted.

T indicates another revolving brush, which may also be made vertically adjustable, similarly supported, and rotating so as to sweep the absorbent surface by means of a belt or otherwise.

The operation of my improved apparatus is as follows: As the liquid starch falls in drops upon the heated rotating absorbent surface, they are carried around in rows by the movement of the surface, and exposed to the atmosphere until they reach the fingers, which are so placed as to be in line with the drops and to strike them and loosen them from the surface. Thus loosened they then pass on, still subjected to the heat and absorption of the surface and to the action of the atmosphere until, sufficiently dry, they reach the rotating brush S, which sweeps them off from the absorbent surface into any suitable receptacle. The brush T serves merely to clean the absorbent surface thoroughly and prepare it for the reception of the drops of liquid starch as it passes under the tank.

I do not confine myself to the details of construction of the parts as illustrated in my drawings, because the substance of my invention as herein disclosed may be embodied under various formal modifications. One of the advantages of my invention is that two or more absorbent surfaces, with accompanying operative parts, may be employed one above the other within the same building or inclosure, and therefore with great economy.

The diameter of the absorbent surface and its speed of rotation should be such that the starch will be sufficiently dried to be appropriately swept off by the brush S when it reaches that point. Of course an annular absorbent surface of very large diameter might be rotated more rapidly than one of much smaller diameter. I find that an absorbent surface of about twenty feet in diameter, rotated at the rate of about twelve to fifteen revolutions per hour, and heated by steam at ordinary heating temperature—say, 125° Fahrenheit—works very successfully; but all these conditions, as will be obvious to those skilled in the art, are susceptible of some variation in practice, and some parts of my apparatus may be used with advantage without the others.

Having thus described my invention, what I claim to be new, and desire to secure by Letters Patent of the United States, is—

1. In an apparatus for manufacturing starch, the combination of a liquid-starch dripping-tank, and an annular heated absorbent surface rotated beneath the tank, and provided with fingers and brushing apparatus, substantially as and for the purpose set forth.

2. The combination, with the bottom of a liquid-starch containing-tank, of drip-tubes D, inserted therein and projecting downward therefrom, and being open at their bottoms to permit the dripping of the liquid starch, and adjustable plugs or valves E, provided with springs F, tending to keep the valves down in the tubes, substantially as and for the purpose set forth.

3. In an apparatus for the manufacture of starch, an annular absorbent rotary disk or surface, I, substantially as and for the purpose set forth.

In testimony whereof I have hereunto subscribed my name.

FLAVIUS P. STIKER.

Witnesses:
S. G. HOWE,
WM. V. BURR.